(12) United States Patent
Rinehart

(10) Patent No.: US 8,795,024 B2
(45) Date of Patent: Aug. 5, 2014

(54) MULTI-FUNCTIONAL MOUNT

(76) Inventor: John R. Rinehart, Milton, WI (US)

( * ) Notice: Subject to any disclaimer, the term of this patent is extended or adjusted under 35 U.S.C. 154(b) by 133 days.

(21) Appl. No.: 13/612,234

(22) Filed: Sep. 12, 2012

(65) Prior Publication Data

US 2014/0072733 A1 Mar. 13, 2014

(51) Int. Cl.
*A63H 3/00* (2006.01)
*A63H 3/50* (2006.01)

(52) U.S. Cl.
CPC ... *A63H 3/50* (2013.01); *A63H 3/00* (2013.01)
USPC ................................................... 446/268

(58) Field of Classification Search
CPC ............. A63H 3/10; A63H 3/50; G09B 23/26
USPC ............. 446/71, 72, 139, 268, 321, 325, 331; 248/519, 524; 434/295, 296
See application file for complete search history.

(56) References Cited

U.S. PATENT DOCUMENTS

| | | | |
|---|---|---|---|
| 2,454,095 A * | 11/1948 | Sandlovich | 248/346.03 |
| 3,009,284 A * | 11/1961 | Ryan | 446/376 |
| 3,801,055 A | 4/1974 | Stenger | |
| 4,942,845 A | 7/1990 | Lane | |
| 5,378,187 A * | 1/1995 | Forbes et al. | 446/268 |
| 5,445,317 A * | 8/1995 | Sokolowski | 232/34 |
| 5,810,318 A | 9/1998 | Federico | |
| 6,179,685 B1 * | 1/2001 | Toft | 446/390 |
| 6,513,284 B1 | 2/2003 | Sandlin | |
| 6,659,463 B2 * | 12/2003 | Mackey | 273/276 |
| 6,824,113 B1 | 11/2004 | Gee et al. | |
| D620,225 S * | 7/2010 | Dinh | D99/29 |
| 2007/0087651 A1 * | 4/2007 | Ali | 446/137 |
| 2008/0257947 A1 | 10/2008 | Guo et al. | |
| 2011/0312242 A1 * | 12/2011 | Muller et al. | 446/72 |

OTHER PUBLICATIONS

The Mailbox Works webpage, http://www.mailboxworks.com/residential-mailboxes/novelty.html, printed Jan. 3, 2012.

* cited by examiner

*Primary Examiner* — Kurt Fernstrom
(74) *Attorney, Agent, or Firm* — Foley & Lardner LLP

(57) ABSTRACT

An article of manufacture can include a figurine body and a first mounting pad. The first mounting pad can include a notch located in the bottom of the first mounting pad. The first mounting pad can include a first mounting mechanism. The figurine body and the first mounting pad can be separated by a guide groove. Upon removal of the first mounting pad from the figurine body at at least the guide groove, an opening is exposed to form a second mounting mechanism.

20 Claims, 8 Drawing Sheets

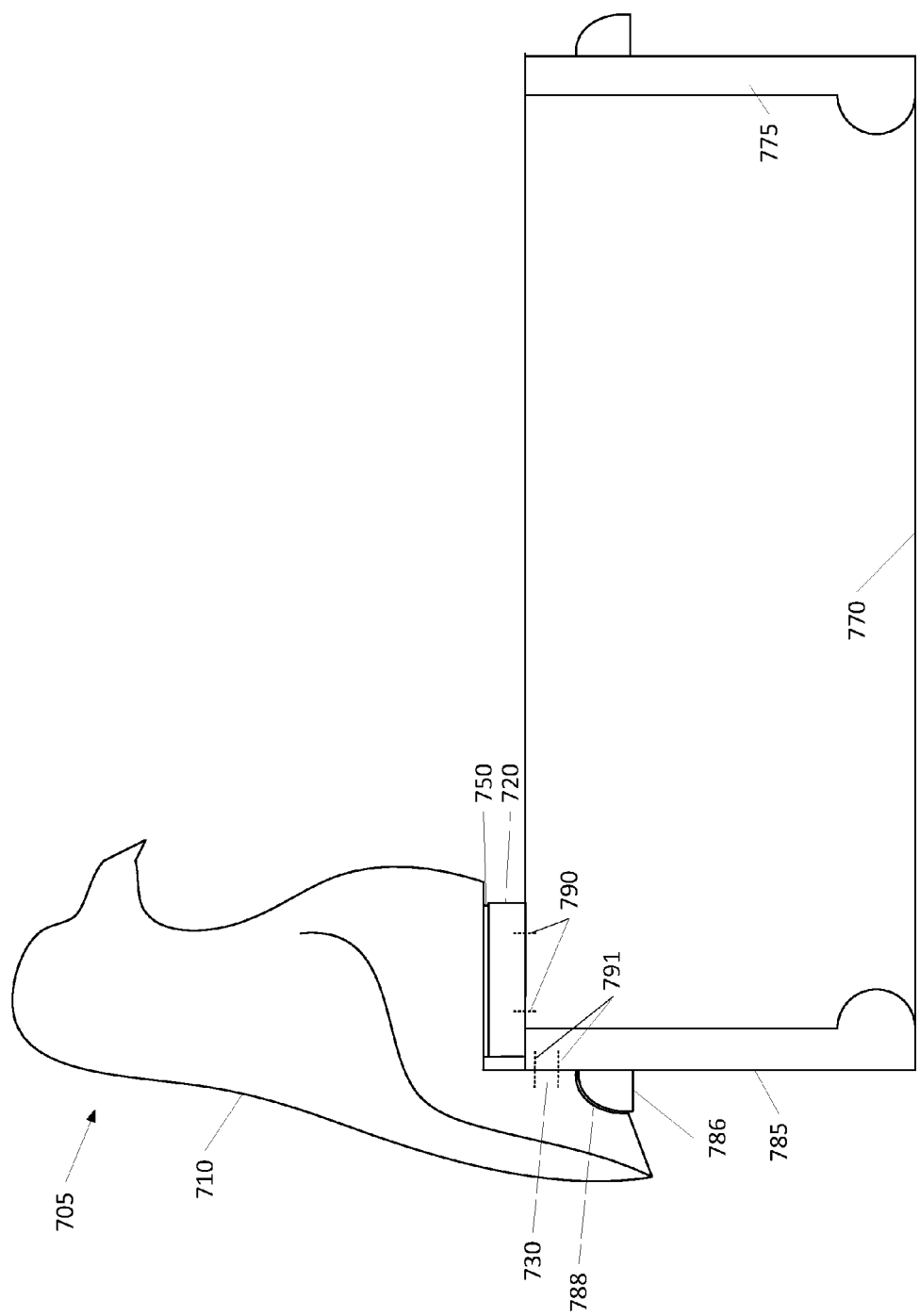

MULTI-FUNCTIONAL MOUNT

BACKGROUND

The present invention relates generally to the field of object mounts, and more particularly to the field of figurine mounts.

Many people enjoy having figurines placed in their yards, such as birds, fish, wild animals, domestic animals, decorations, symbols, sporting memorabilia, etc. For example, in some areas it is popular to have a realistic deer or bird figurine in one's yard to simulate living in the midst of wildlife. In addition, it is common to place decoys, such as owls or hawks, in and around barns and warehouses to deter certain birds, mice and other pests from entering the building.

SUMMARY

In one embodiment, an article of manufacture can include a figurine body and a first mounting pad. The first mounting pad can include a notch located in the bottom of the first mounting pad. The first mounting pad can be a first mounting mechanism. The figurine body and the first mounting pad can be separated by a guide groove. When the first mounting pad is removed from the figurine body at at least the guide groove, an opening is exposed thereby creating a second mounting mechanism.

In another embodiment, an assembly can include a figurine mounted to a mailbox. The figurine can include a figurine body and a first mounting pad. The first mounting pad can include a notch located in the bottom of the first mounting pad. The first mounting pad can be a first mounting mechanism. The figurine body and the first mounting pad can be separated by a guide groove. When the first mounting pad is removed from the figurine body at at least the guide groove, an opening is exposed thereby creating a second mounting mechanism.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 4A is a detail view of the mating area between the figurine and mailbox.

FIG. 7b is a side view of a figurine mounted on a mailbox with a rear door in accordance with an illustrative embodiment.

DETAILED DESCRIPTION OF THE ILLUSTRATIVE EMBODIMENTS

Figure 1:
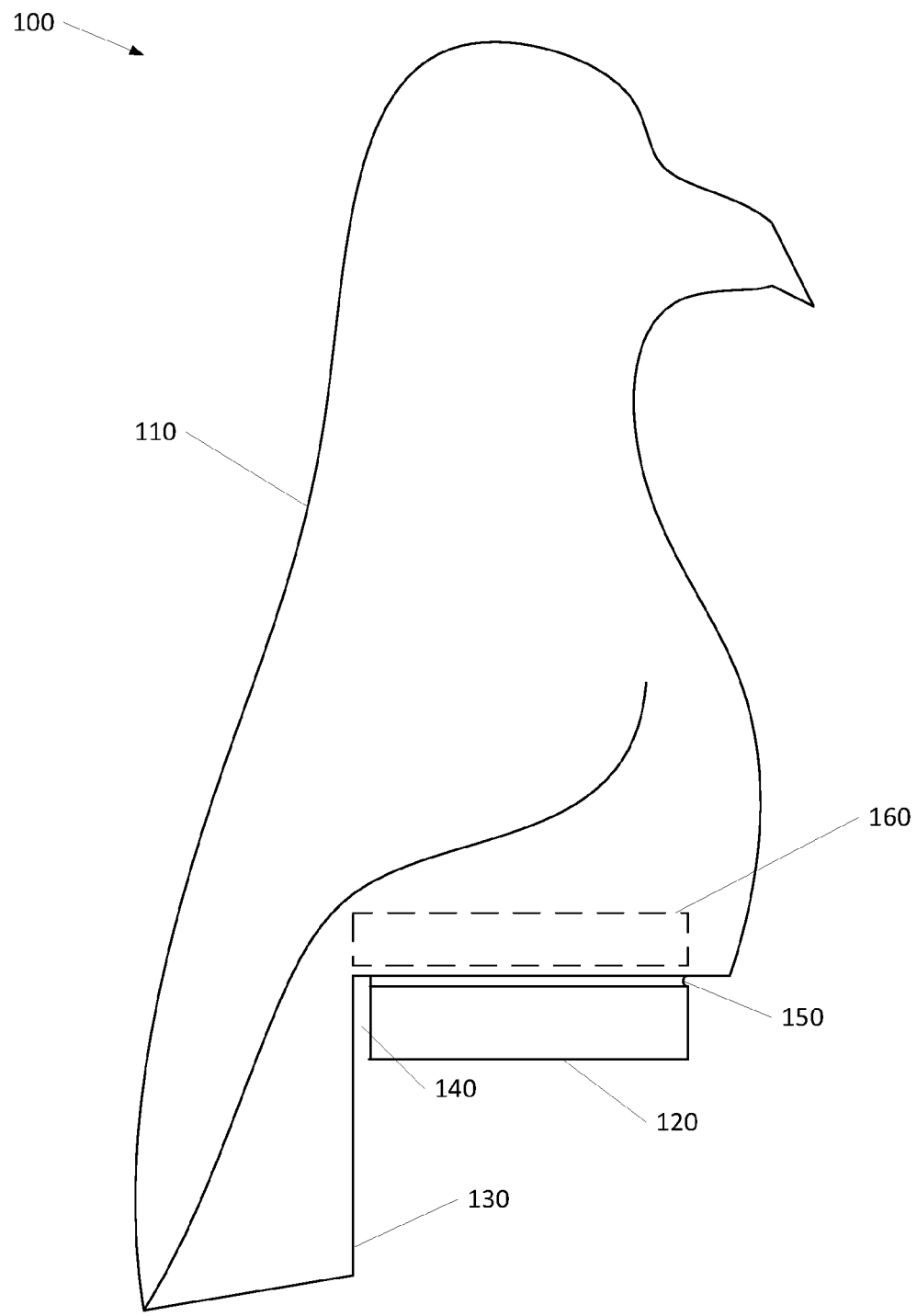
FIG. 1 is a side view of a figurine in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is directed to a figurine mount and method of mounting the same. Referring to FIG. 1, a side view of a figurine 100 in accordance with an illustrative embodiment is shown. The figurine 100 can include a figurine body 110, a first mounting pad 120, a second mounting pad 130, a guide groove 150, and a fastening area 160. The figurine body 110 can be any shape or form. FIG. 1 depicts the form of an eagle; however, any animal, shape, symbol, or form could be used. In particular, FIG. 1 depicts a side view of an eagle. In other embodiments, the figurine body 110 can be, for example, a crane, an owl, or a hawk shape. In other embodiments, the shape or form could be a holiday decoration, a football helmet, a baseball, a basketball, etc.

The figurine 100 can be made of plastic, reinforced plastic, fiberglass, composite, cementous material, metal, or any other material. The figurine 100 can be manufactured using various techniques such as injection molding, blow molding, stamping or casting. The figurine 100 can be monolithic or made of multiple pieces. For example, the first mounting pad 120 can be a separate piece.

In one embodiment, the first mounting pad 120 can be a rectangular box shape. The first mounting pad 120 can be a mounting mechanism. The first mounting pad 120 can be hollow, as described further below. The inside base dimensions of the hollow of the first mounting pad 120 can be about the size of a post. For example, the inside base dimensions can be about 4 inches by 4 inches. The inside base dimensions can be other common post dimensions, common pipe dimensions, or any other dimensions. In one embodiment, the bottom of the first mounting pad 120 can be configured to attach to a flat surface. In one embodiment, the first mounting pad 120 can be used to secure the figurine 100 to an object, such as a mailbox.

The first mounting pad 120 can include a notch 140. The notch 140 can extend into the hollow of the first mounting pad 120. In one embodiment, the notch 140 does not extend through a side of the first mounting pad 120. Alternatively, the notch 140 may extend through the side of the first mounting pad 120. The notch 140 can be configured to receive a portion of another object to which the figurine 100 can be attached. In one embodiment, the notch 140 can be configured to receive the top, back end (or lip) of a mailbox. In another embodiment, the notch 140 can be configured to simultaneously adapt to multiple objects. For example, the notch 140, which can be a single notch, can be configured to adapt to a mailbox or a newspaper box. In another embodiment, the notch 140 can be configured to adapt to a protrusion from a mounting surface. In one embodiment, the first mounting pad 120 can be located at or under the bottom of the figurine body 110. For example, the first mounting pad 120 can be located at the feet of a perched bird, as depicted in FIG. 1.

The first mounting pad 120 can be separated from the figurine body 110 by a guide groove 150. The guide groove 150 can be a shallow groove around at least part of the first mounting pad 120. In one embodiment, the guide groove 150 can extend around three sides of the first mounting pad 120. In an illustrative embodiment, the notch 140 extends up to the guide groove 150 as illustrated in FIG. 1. The guide groove 150 can be configured such that a person can easily remove the first mounting pad 120 from the figurine body 110. For example, the guide groove 150 can be thinner in depth than surrounding areas of the first mounting pad 120 and the figurine body 110. Hence, starting at a front of the mounting pad 120, an individual can cut through the guide groove 150 until the individual reaches the notch 140, thereby separating the first mounting pad 120 from the figurine body 110. In addition, the guide groove 150 can provide a track for the person to cut through, thereby improving the accuracy of the cut. In an illustrative embodiment, the notch 140 can be formed such that the notch 140 meets the guide groove 150 on the sides of the first mounting pad 120 and is adjacent to the rear of the first mounting pad 120. As such, when a person cuts through the guide groove 150 formed on the front and sides of the first mounting pad 120, the first mounting pad 120 can break away from the figurine body 110 (e.g., because the entire rear side of the first mounting pad 120 is adjacent to the notch 140).

The second mounting pad 130 can be integrated into the figurine body 110. The second mounting pad 130 can be configured to enhance the stability of a mounted figurine 100. The second mounting pad 130 can be a mounting mechanism. The location of the second mounting pad 130 can be chosen such that the figurine body 110 maintains a natural appearance. In one embodiment, the second mounting pad 130 can be substantially orthogonal (e.g., perpendicular) to the first mounting pad 120. Substantially orthogonal can mean plus or minus 10 degrees from orthogonal. In one embodiment, the second mounting pad 130 can be a flat area located 1 inch to 7 inches away from the first mounting pad 120. The second mounting pad 130 can be configured to adapt to a post. In another embodiment, the second mounting pad 130 can be configured to simultaneously adapt to multiple objects. For example, second mounting pad 130 can be configured to adapt to a post or pole. In one embodiment, the second mounting pad 130 can be located on an appendage of the figurine body 110. For example, the second mounting pad 130 can be located at the tail of a perched bird, as depicted in FIG. 1. In one embodiment, the second mounting pad 130 can be used to secure the figurine 100 to an object, such as the rear of a mailbox.

The fastening area 160 can be configured to provide an attachment between a mounting object, such as a post, and the figurine body 110. The inside of the figurine body 110 and the fastening area 160 can be a mounting mechanism. In one embodiment, when the first mounting pad 120 is removed and a post is inserted into the base of the figurine body 110, the fastening area 160 can lie tight against the post. A person can fasten the figurine body 110 to the post, for example, using fasteners through the fastening area 160 or adhesive between the fastening area 160 and the post. In another embodiment, the fastening area 160 can be configured to lie tight against a pole or any other mounting object. In another embodiment, the fastening area 160 can be located at the front, back or any other area of the figurine body 110.

Figure 2:
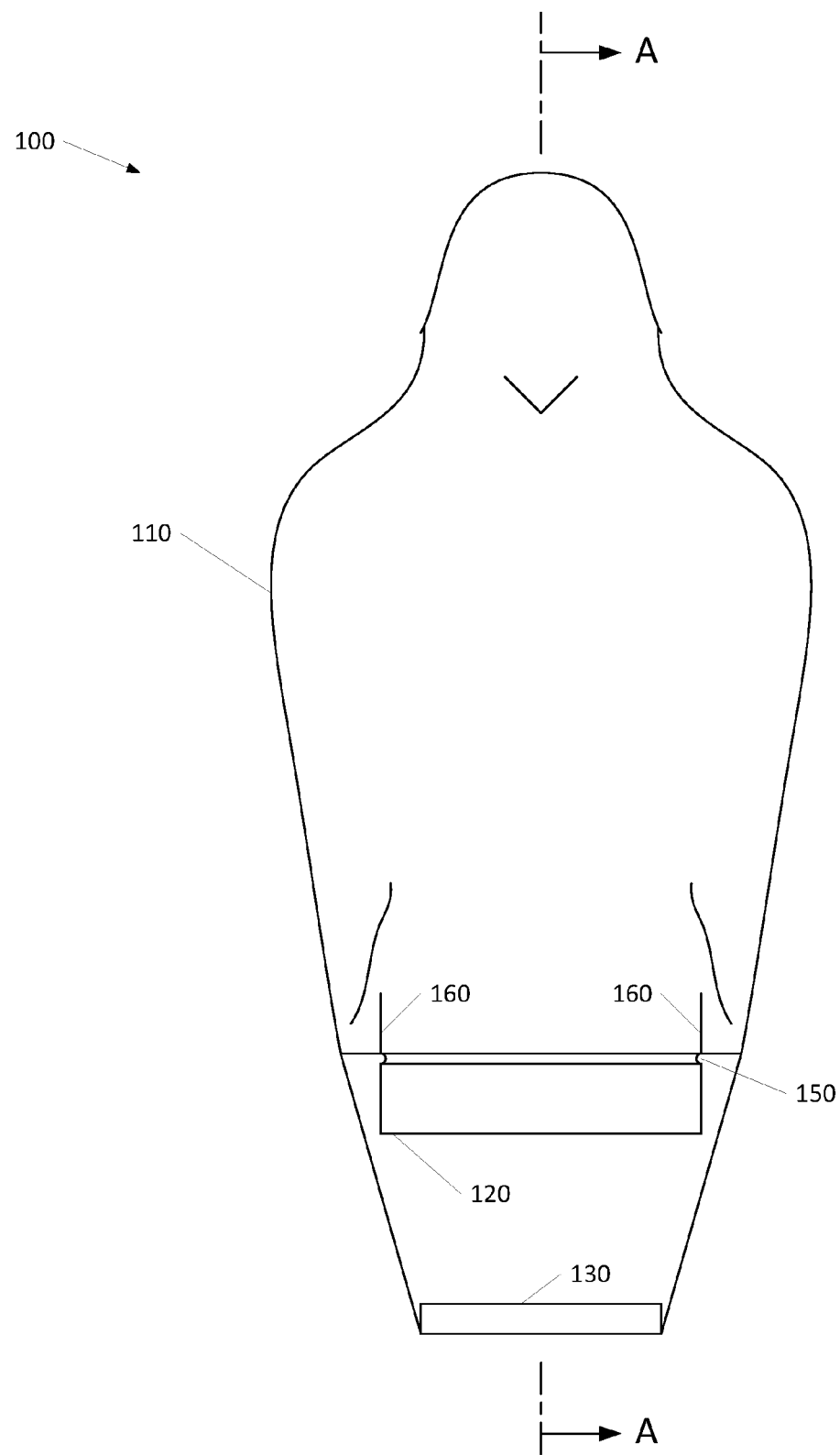
FIG. 2 is a front view of the figurine of FIG. 1 in accordance with an illustrative embodiment.

Referring to FIG. 2, a front view of the figurine 100 of FIG. 1 in accordance with an illustrative embodiment is shown. As described above, the figurine 100 can include the figurine body 110, the first mounting pad 120, the second mounting pad 130, the notch 140 (not visible in FIG. 2), the guide groove 150, and the fastening area 160. The figurine body 110 can be any shape or form. FIG. 2 depicts the form of an eagle; however, any animal, shape, or form could be used.

In one embodiment, the first mounting pad 120 can be a rectangular box shape. The notch 140 of the first mounting pad 120 can extend into the hollow of the first mounting pad 120 as described with reference to FIG. 1. The notch 140 can be configured to adapt to the shape of another object to which the figurine 100 can be attached. In one embodiment, the notch 140 can be configured to adapt to the top, back end of a mailbox. As depicted in FIG. 2, the first mounting pad 120 can be located at the feet of a perched bird.

The guide groove 150 can be a shallow groove around at least part of the first mounting pad 120. In one embodiment, the guide groove 150 can extend around three sides of the first mounting pad 120. FIG. 2 depicts the guide groove 150 extending along the front side of the first mounting pad 120 and continuing to the right and left sides of the first mounting pad 120.

The second mounting pad 130 can be integrated into the figurine body 110. The second mounting pad 130 can be substantially rectangular; however, the second mounting pad 130 can be any shape. As depicted in FIG. 2, the second mounting pad 130 can be a flat surface located at the tail of a perched bird.

The fastening area 160 can be configured to provide an attachment between a mounting object, such as a post, and the figurine body 110. In one embodiment, when the first mounting pad 120 is removed and a post is inserted into the base of the figurine body 110, the fastening area 160 can lie tight against the post. The fastening area 160 can generally be disposed in a vertical fashion depending on the shape of the figurine body 110. As depicted in FIG. 2, the fastening area 160 can be located on a right and left side of the figurine body 110. Hence, when a post is inserted into the base of the figurine body 110, the figurine body 110 can be fastened to the post using the fastening area 160 on both the left and right sides of the figurine body 110.

Figure 3:
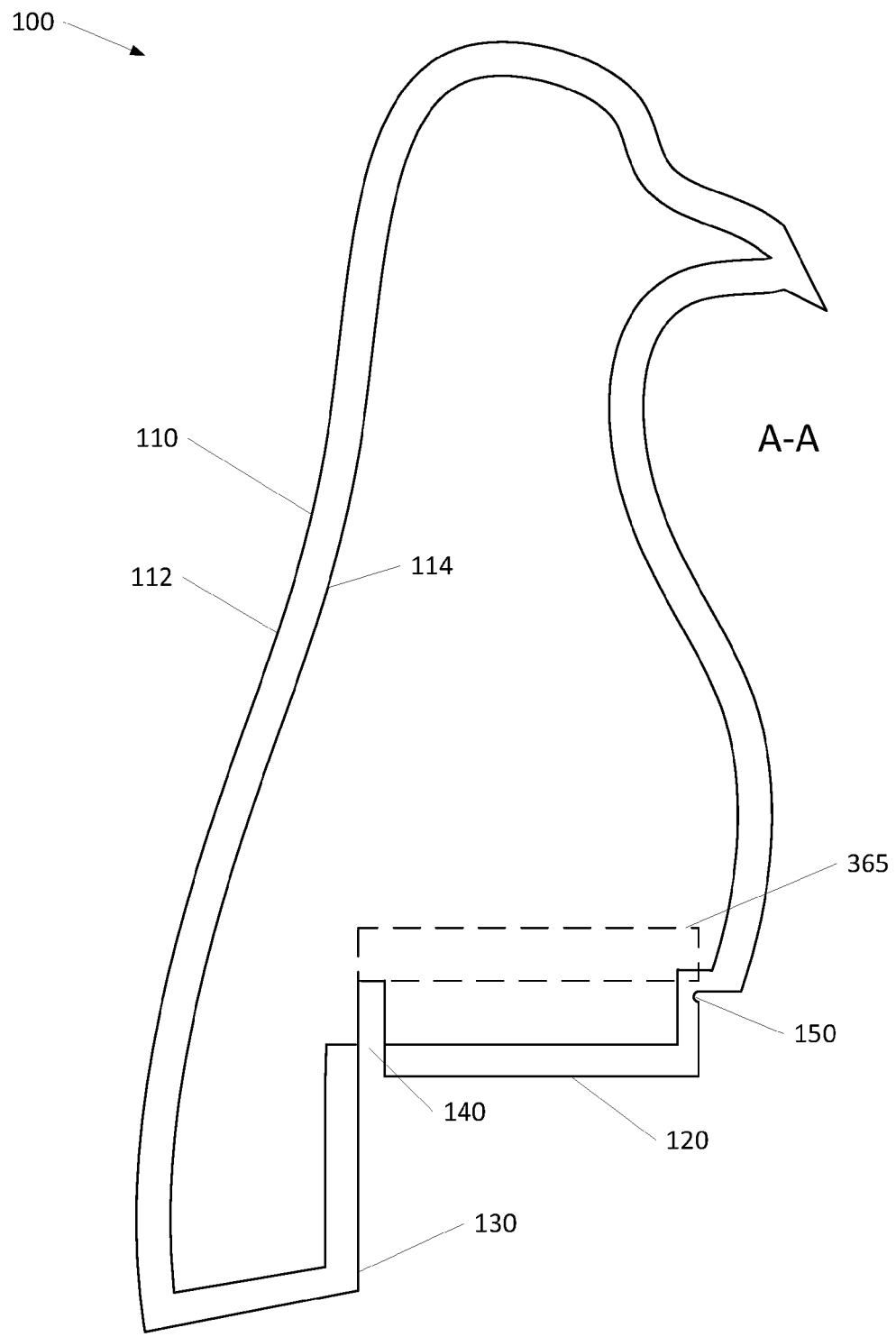
FIG. 3 is a section view of the figurine of FIG. 1 in accordance with an illustrative embodiment.

Referring to FIG. 3, a section view of the figurine 100 of FIG. 1 in accordance with an illustrative embodiment is shown. As described above, the figurine 100 can include the figurine body 110, the first mounting pad 120, the second mounting pad 130, the notch 140, the guide groove 150, and the fastening area 160. The figurine body 110 can be any shape or form. FIG. 3 depicts the form of an eagle; however, any animal, shape, or form could be used.

FIG. 3 depicts an outside surface 112 and an inside surface 114 of the figurine 100. As noted above, the figurine 100 can be made of plastic, reinforced plastic, fiberglass, composite, cementous material, metal, or any other material. The figurine 100 can be monolithic or made of multiple pieces. FIG. 3 depicts a monolithic figurine 100. The thickness between the outside surface 112 and the inside surface 114 can be any thickness. In one embodiment, the thickness between the outside surface 112 and the inside surface 114 can be in a range between about 0.01 inches to 0.5 inches; however, the thickness can be any thickness.

In addition, the thickness between the outside surface 112 and the inside surface 114 can vary. For example, the thickness between the guide groove 150 and the inside surface 114 can be less than an overall thickness between the outside surface 112 and the inside surface 114, in order to ease removal of the first mounting pad 120.

The inside surface 114 can include an inside fastening area 365. The inside fastening area 365 can be configured to provide an attachment surface between a mounting object, such as a post, and the figurine body 110. In one embodiment, when the first mounting pad 120 is removed and a post is inserted into the base of the figurine body 110, the inside fastening area 365 can lie tight against the post. A person can fasten the figurine body 110 to the post, for example, using fasteners through the inside fastening area 365 or adhesive between the inside fastening area 365 and the post. In another embodiment, the inside fastening area 365 can be configured to lie tight against a pole or any other mounting object. In another embodiment, the inside fastening area 365 can be located at the front, back or any other area of the figurine body 110.

The guide groove 150 can be a shallow groove around at least part of the first mounting pad 120. In one embodiment, the guide groove 150 can extend around three sides of the first mounting pad 120, and two sides of the guide groove 150 can meet with the notch 140. FIG. 3 depicts a cross-section of the guide groove 150 at the front of the first mounting pad 120 (the two sides of the guide groove 150 that meet with the notch 140 are not visible in the cross section view).

The second mounting pad 130 can be integrated into the figurine body 110. As depicted in FIG. 3, a mounting surface of the second mounting pad 130 can be substantially vertical.

Advantageously, the figurine 100 can be easily configured to adapt to multiple mounting situations. Advantageously, the first mounting pad 120 can be separated from the figurine body 110 by cutting through guide groove 150 up to the notch 140, so that a post can be inserted into figurine 100. Advantageously, the fastening area 365 can be used to secure the figurine body 110 to the post. Advantageously, the first mounting pad 120 and the second mounting pad 130 can be used to mount the figurine 100 to an object.

Figure 4:
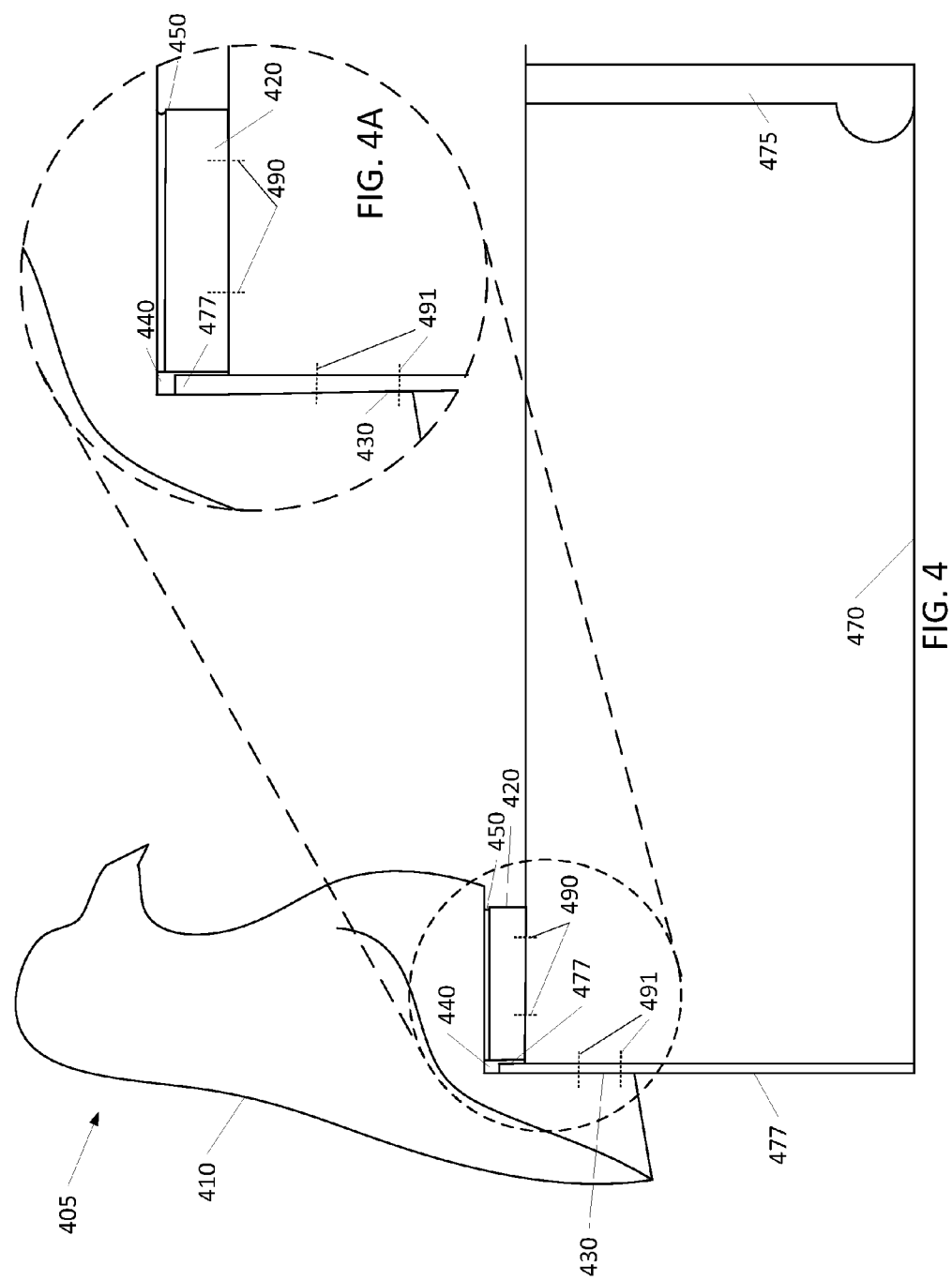
FIG. 4 is a side view of a figurine mounted on a mailbox in accordance with an illustrative embodiment.

Referring to FIG. 4, a side view of a figurine 405 mounted on a mailbox 470 in accordance with an illustrative embodiment is shown. FIG. 4A shows a detail view of the mating area between the figurine 405 and mailbox 470, using the same element numbers. As described above, the figurine 405 can include a figurine body 410, a first mounting pad 420, a second mounting pad 430, a notch 440, and a guide groove 450. In FIG. 4, the first mounting pad 420 remains attached to the figurine body 410. The figurine 405 can sit on the top of the mailbox 470, such that the first mounting pad 420 is located on the top of the back of the mailbox 470 and the second mounting pad 430 is located against the back of the mailbox 470.

The mailbox 470 can be a standard mailbox with an arched top. The mailbox 470 can include a door 475 and a lip 477. The lip 477 can be the seam where the top of the mailbox 470 and the back of the mailbox 470 are seamed together. For example, in a steel mailbox, a seaming machine will roll and press the top and back of the mailbox together. The lip 477 can extend beyond the body of the mailbox 470. Alternatively, the lip 477 can be an aesthetic detail added to the mailbox 470.

The notch 440 can be configured to receive the lip 477 to sit in so that the first mounting pad 420 can sit flush on the top of the mailbox 470. Thus, in one embodiment, the notch 440 is shaped large enough to allow for the top portion of the lip 477. Further, the notch 440 can enable the second mounting pad 130 to contact the back of the mailbox 470.

The figurine 405 can be attached to the mailbox 470 using fasteners. For example, one or more fasteners 490 can be placed through the inside of the mailbox 470 into the first mounting pad 420. In addition, one or more fasteners 491 can be placed through the inside of the mailbox 470 into the second mounting pad 430. The fasteners 490, 491 can be screws, rivets, or any other fastener. Alternatively, the figurine 405 can be attached to the mailbox 470 using adhesive.

Advantageously, the figurine 405 can be easily configured to adapt to multiple mounting situations. Advantageously, the first mounting pad 420 and the second mounting pad 430 can be used to mount the figurine 405 to the mailbox 470.

Figure 5:
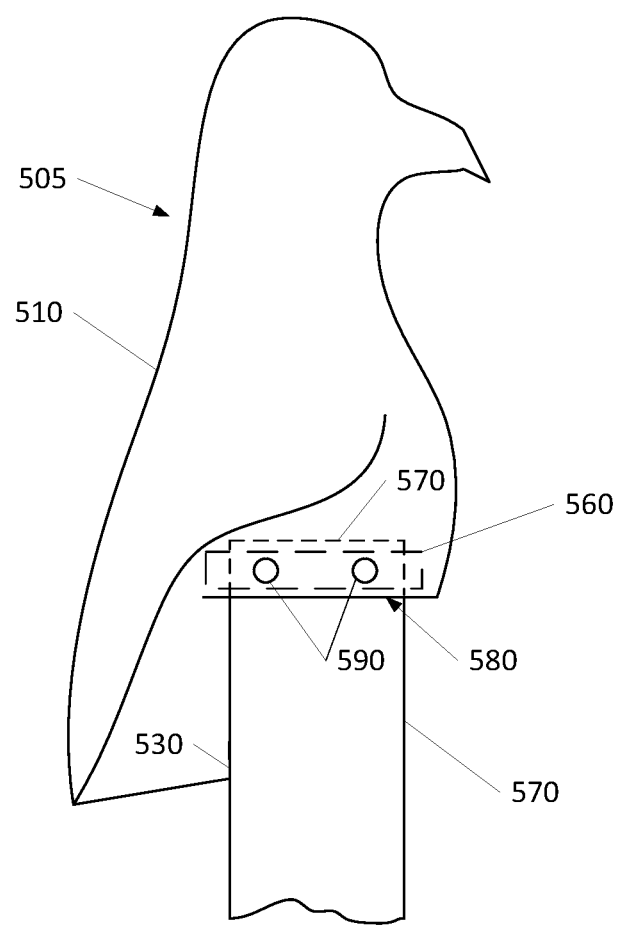
FIG. 5 is a side view of a figurine mounted on a post in accordance with an illustrative embodiment.

Referring to FIG. 5, a side view of a figurine 505 mounted on a post 570 in accordance with an illustrative embodiment is shown. As described above, the figurine 505 can include a figurine body 510, a second mounting pad 530, and a fastening area 560. Notably, in FIG. 5, the first mounting pad has been removed from the figurine body 510 as described above. In FIG. 5, the first mounting pad was cut from the figurine body 510 at the guide groove to the notch, thereby creating an opening 580 at the bottom of the figurine body 510. In at least one dimension, the opening 580 is about the same size as a cross-section of the post 570. In one embodiment, the cross-section of the post 570 can be about 4 inches by 4 inches, or 3.5 inches by 3.5 inches.

The figurine 505 can sit on the top of the post 570, such that the top of the post 570 is inserted through the opening 580 into at least a portion of the figurine body 510. The second mounting pad 530 can rest against the side of the post 570. In one embodiment, the post 570 can be inserted into the figurine body 510 until the figurine body 510 rests on the top of the post 570.

The figurine 505 can be attached to the post 570 using fasteners. For example, one or more fasteners 590 can be placed through the fastening area 560 (on both sides) into the post 570. The fasteners 590 can be screws, rivets, or any other fastener. Alternatively, the figurine 505 can be attached to the post 570 using adhesive.

Advantageously, the figurine 505 can be easily configured to adapt to multiple mounting situations. Advantageously, the first mounting pad 520 can be separated from the figurine body 510 by cutting through a guide groove, so that the post 570 can be inserted into figurine 505. Advantageously, the fastening area 560 can be used to mount the figurine 505 to an object.

Figure 6:
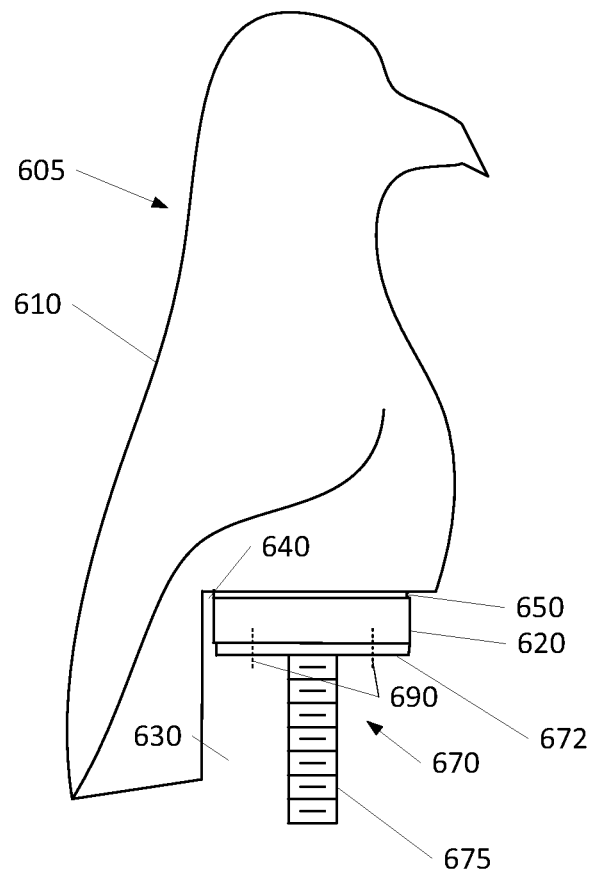
FIG. 6 is a side view of a figurine mounted on an adapter in accordance with an illustrative embodiment.

Referring to FIG. 6, a side view of a figurine 605 mounted on an adapter 670 in accordance with an illustrative embodiment is shown. As described above, the figurine 605 can include a figurine body 610, a first mounting pad 620, a second mounting pad 630, a notch 640, a guide groove 650, and a fastening area 660. The first mounting pad 620 remains attached to the figurine body 610. The adapter 670 can be attached to the bottom of the second mounting pad 630 so that the figurine 605 mounted on the adapter 670 can be mounted on other objects. For example, the adapter 670 can be used to mount the figurine 605 on a fence rail or beam.

The adapter 670 can include a plate 672 and a threaded stud 675. In one embodiment, the threaded stud 675 can be welded to or pressed into the plate 672. The plate 672 can include, for example, four holes near the corners for securing the adapter 670 to the figurine 605. The adapter 670 can be configured such that the threaded stud 675 can be used to secure the figurine 605 to an object through a hole. For example, the threaded stud 675 can be inserted through a hole drilled through a fence rail and secured using a washer and nut.

The plate 672 of the adapter 670 can be attached to the figurine 605 using fasteners 690. For example, one or more fasteners 690 can be placed through the plate 672 of the adapter 670 into the first mounting pad 620. The fasteners 690 can be screws, rivets, or any other fastener. Alternatively, the figurine 605 can be attached to the adapter 670 using adhesive.

Advantageously, the figurine 605 can be easily configured to adapt to multiple mounting situations. Advantageously, the first mounting pad 620 can be used to mount the figurine 605 to an object using an adapter 670.

Figure 7A:
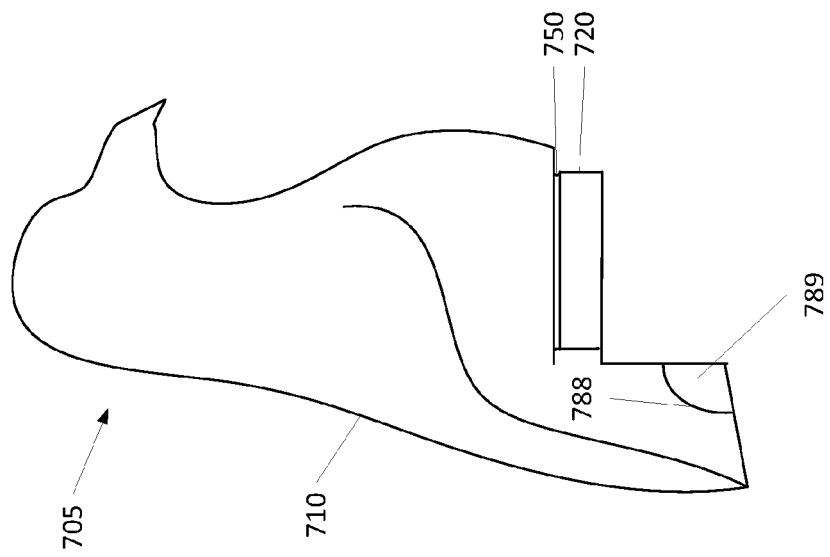
FIG. 7a is a side view of a figurine with a handle groove in accordance with an illustrative embodiment.

Referring to FIG. 7a, a side view of a figurine 705 with a handle groove 788 in accordance with an illustrative embodiment is shown. As described above, the figurine 705 can include a figurine body 710, a first mounting pad 720, and a first guide groove 750. In an illustrative embodiment, figurine 705 can also include a second guide groove 788. Similar to the first guide groove 750, a removable section 789 of the figurine body 710 can be separated from the body 710 along the second guide groove 788. The second guide groove 788 can be configured such that a person can easily remove the removable section 789 of figurine 705 outlined by the second guide groove 788. The second guide groove 788 can be a shallow groove around at least part of the figurine body. The second guide groove 788 can be thinner in depth than surrounding areas of the figurine body 710. Hence, starting at a front (or bottom) of the removable section 789, an individual can cut through the second guide groove 788 until the individual reaches the bottom (or front) of removable section 789, thereby separating the removable section 789 from the figurine body 710. In addition, the second guide groove 788 can provide a track for the person to cut through, thereby improving the accuracy of the cut. Alternatively, the second guide groove 788 can allow the removable section 789 to break away and be removed by hand without the use of a saw, utility knife, or other tool.

Referring to FIG. 7b, a side view of a figurine 705 mounted on a mailbox 770 with a rear door 785 in accordance with an illustrative embodiment is shown. As described above, the figurine 705 can include a figurine body 710, a first mounting pad 720, a second mounting pad 730, a first guide groove 750, and fasteners 790 and 791. In FIG. 7b, the mounting pad 720 remains attached to the figurine body 710. The figurine 705 can sit on the top of the mailbox 770, such that the first mounting pad 720 is located on the top of the back of the mailbox 770. The mailbox 770 can be a mailbox with an arched top or a substantially flat top. The mailbox 770 can include a front door 775 and a rear door 785. The rear door 785 can include a rear handle 786. As described above, figurine 710 can include a second guide groove 788. In FIG. 7b, the removable section 789 has been removed from the figurine body 710. The second guide groove 788 can further be configured to allow the second mounting pad 730 to rest against the rear door 785 (i.e., the rear door handle 786 occupies at least a portion of the space created by removing the removable section 789 (not shown) of the figurine 705 outlined by second guide groove 788). The second guide groove 788 can be further configured such that the figurine body 710 is supported at least in part by the rear door 785 resting along the second guide groove 788. In another embodiment, the removable section 789 (not shown) of figurine 705 outlined by the second guide groove 788 may include at least a portion of the second mounting pad 730 such that the second mounting pad 730 is at least partially removed from the figurine body 710. In an alternative embodiment, the second guide groove 788 may be large enough to allow the rear door 785 to operate if the removable section 789 (not shown) of figurine 705 is removed (i.e., swing down without interference from figurine 705).

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An article of manufacture comprising:
    a figurine body; and
    a first mounting pad comprising a notch located in a bottom of the first mounting pad,
    wherein:
        the first mounting pad comprises a first mounting mechanism;
        the figurine body and the first mounting pad are separated by a guide groove; and
        upon removal of the first mounting pad from the figurine body at at least the guide groove, an opening is exposed to form a second mounting mechanism.

2. The article of manufacture of claim 1, further comprising a second mounting pad.

3. The article of manufacture of claim 2, wherein the second mounting pad is integrated into the figurine body.

4. The article of manufacture of claim 2, wherein the second mounting pad is orthogonal to a bottom of the first mounting pad.

5. The article of manufacture of claim 4, wherein the notch is configured to fit over a lip of a mailbox.

6. The article of manufacture of claim 5, wherein the second mounting pad is configured to lay against a back of the mailbox.

7. The article of manufacture of claim 1, wherein the opening has a cross-section configured to receive a post.

8. The article of manufacture of claim 7, further comprising a fastening area located on a side of the figurine body, wherein the fastening area is configured to lie against the post, wherein the post is inserted into the figurine body.

9. The article of manufacture of claim 7, wherein a cross-section of the post is approximately 4 inches by 4 inches.

10. The article of manufacture of claim 1, wherein the figurine body comprises a bird shape.

11. The article of manufacture of claim 1, wherein the bird shape comprises at least one of an eagle, a crane, an owl, or a hawk.

12. The article of manufacture of claim 1, wherein the figurine body and the first mounting pad comprise a monolithic structure.

13. An assembly comprising:
    a figurine mounted to a mailbox;
    wherein:
        the figurine comprises a figurine body and a first mounting pad including a notch located in a bottom of the first mounting pad,
        the first mounting pad comprises a first mounting mechanism;
        the figurine and the first mounting pad are separated by a guide groove; and
        upon removal of the first mounting pad from the figurine at at least the guide groove, an opening is exposed to form a second mounting mechanism.

14. The assembly of claim 13, wherein the figurine further comprises a second mounting pad.

15. The assembly of claim 14, wherein the second mounting pad is orthogonal to a bottom of the first mounting pad.

16. The assembly of claim 15, wherein the second mounting pad is configured to lay against a back of the mailbox.

17. The assembly of claim 13, wherein the notch is configured to fit over a lip of the mailbox.

18. A method comprising:
    forming a figurine body; and forming a first mounting pad on the figurine body;
forming a notch located in a bottom of the first mounting pad, wherein the first mounting pad comprises a first mounting mechanism; and
forming a guide groove, wherein the figurine body and the first mounting pad are separated by the guide groove, and wherein upon removal of the first mounting pad from the figurine body at at least the guide groove, an opening is exposed to form a second mounting mechanism.

19. The method of claim 18, further comprising forming a second mounting pad on the figurine body.

20. The method of claim 19, wherein the second mounting pad is orthogonal to the bottom of the first mounting pad.

\* \* \* \* \*